United States Patent

[11] 3,582,742

| [72] | Inventor | Samuel H. Martin |
| | | Waynesboro, Pa. |
| [21] | Appl. No. | 720,306 |
| [22] | Filed | Apr. 10, 1968 |
| [45] | Patented | June 7, 1971 |
| [73] | Assignee | Landis Tool Company |
| | | Waynesboro, Pa. |

[54] MACHINE TOOL SPEED CONTROL PROVISIONS
16 Claims, 1 Drawing Fig.

[52] U.S. Cl. ................................................. 318/302,
318/368, 318/380
[51] Int. Cl. ...................................................... H02p 5/04
[50] Field of Search ............................................ 318/302,
305, 368, 379, 380, 358

[56] References Cited
UNITED STATES PATENTS

| 3,348,114 | 10/1967 | Wright; R. L. Jr., et al... | 318/302 |
| 3,375,425 | 3/1968 | Bell; L. K. ........................ | 318/302 |
| 1,039,568 | 9/1912 | McLain ............................ | 318/302 |
| 2,721,968 | 10/1955 | Brown ............................. | 318/X380 |
| 3,348,114 | 10/1967 | Wright, et al. ................ | 318/X302 |

FOREIGN PATENTS

| 478,215 | 10/1951 | Canada ........................ | 318/380 |

*Primary Examiner*—Oris L. Rader
*Assistant Examiner*—K. L. Crosson
*Attorney*—Diller, Brown, Ramik and Halt ABSTRACT: A motor-generator combination for driving a machine tool element is disclosed herein. A generator supplies DC power to a DC machine tool element driving motor and speed control provisions are provided for a rapid reduction of motor speed such as causes regenerative current to be generated by the motor. A rectifier in series with the generator and motor armature prevents the application of regenerative current to the generator while establishing a voltage across such rectifier. A dynamic braking resistor is connectable in parallel with the motor armature to dissipate regenerative current and connection of the resistor across the motor armature is effected by control relays, one of which is connected across the rectifier for energization by the voltage occurring thereacross. Parallel connection of the braking resistor with the motor armature is broken upon a reduction in regenerative current and normal motor operation is resumed at a reduced speed.

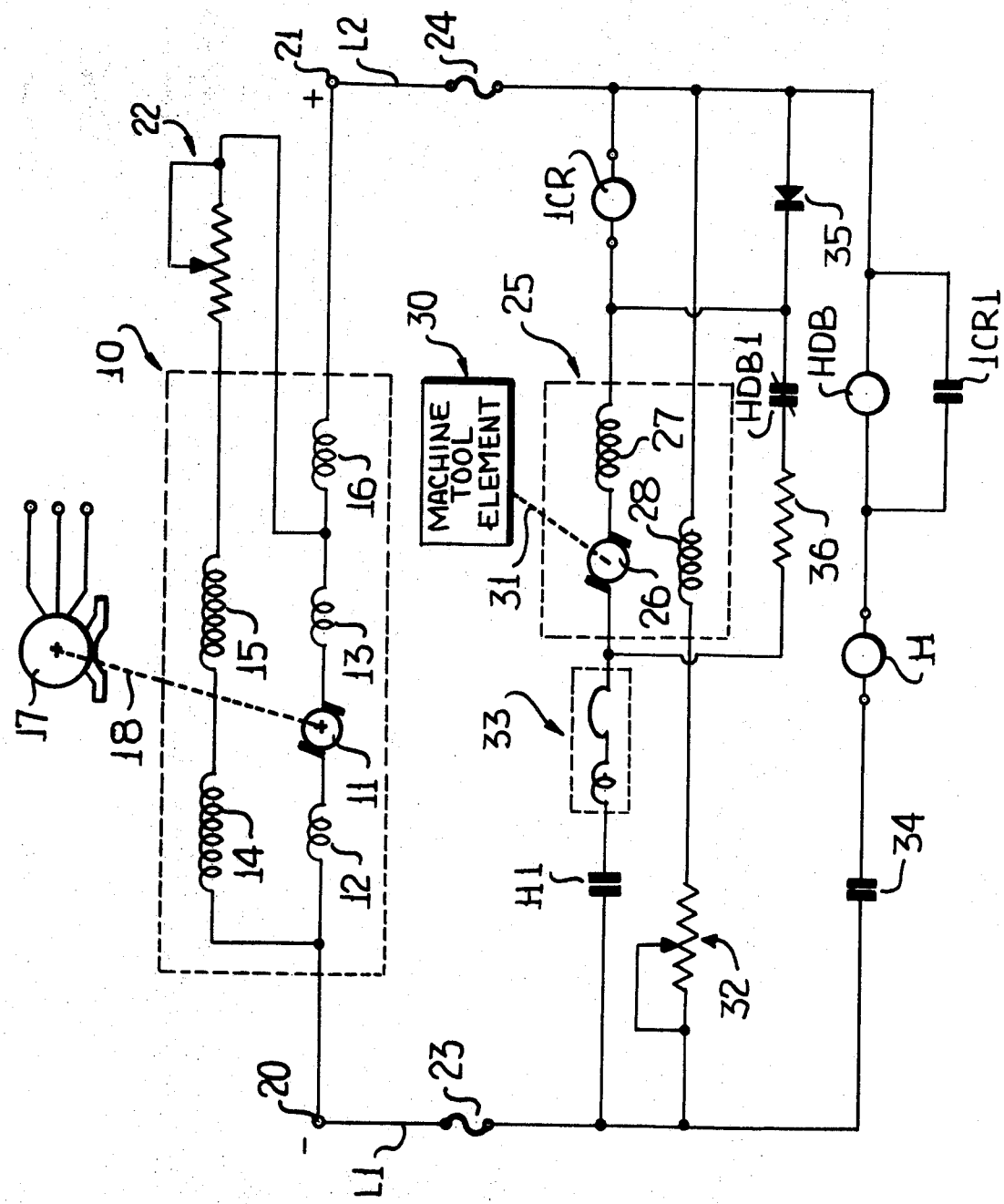

MACHINE TOOL SPEED CONTROL PROVISIONS

This invention relates to motor speed control provisions and more particularly to the combination of a DC motor and a compound wound generator wherein speed control is employed to determine the speed at which the motor drives a machine tool element and wherein regenerative current, occurring upon a reduction in motor speed is dissipated without deenergization of the motor.

It is well known that regenerative current is produced in the armature circuit of a DC motor when the speed of such motor is rapidly reduced as by the employment of a control rheostat, increasing the current in the field winding of the DC motor. In such instances, the motor acts as a generator during the time the speed of the motor is decreasing. Where a DC generator provides the power source for the motor, regenerative current produced through a sudden reduction of motor speed may exceed the current supplied to the motor from the DC generator, in which case the regenerative current will be applied to the generator. The problem of handling regenerative current is particularly acute where, as in machine tool applications, a sudden reduction in motor speed is mandatory. Further intensification of such problem occurs where the speed at which the motor is driven exceeds the running speed of the generator. In such instances, the polarity of the generator is reversed, the motor circuit is consequently disrupted and both the generator and motor can fail to resume normal operation upon cessation of the regenerative current.

The production of regenerative current from the armature of a DC motor is encountered where such motor has been disconnected and is brought to a stop. Previously, a dynamic braking resistor has been employed to provide braking action by resistance to the regenerative current in such instances. However, where motor speed is to be suddenly reduced, and normal motor operation is to be maintained at a lower speed, as for example where the speed of a machine tool element is to be controlled, it is not desirable to disconnect the motor during the slow down period.

In view of the foregoing, it is an object of this invention to control the regenerative current from a motor during the reduction of motor speed.

It is a further object of this invention to provide means for dissipating regenerative current upon the reduction of motor speed without disconnection of the motor and allowing an immediate resumption of normal motor operation at the lower speed.

Further, it is an object of this invention to provide means electrically connected with the armature circuit of a DC motor for blocking a flow of regenerative current from the armature and for simultaneously controlling the flow of such current to provide dissipation thereof.

Yet another object of this invention is to provide in series connection with a motor armature, a rectifier blocking the flow of regenerative current from the armature, and relay provisions responsive to the establishment of a voltage across the rectifier for controlling the direction of flow of the regenerative current.

Yet another object of this invention is to provide a DC motor and generator combination including provisions in the circuit of the motor and generator for blocking regenerative current and for directing regenerative current into a braking circuit for the dissipation thereof.

A still further object of this invention is to provide speed control provisions for controlling the speed at which a machine tool element is driven and including a motor and generator combination including a rectifier for blocking the passage of regenerative current from the motor armature to the generator and a relay responsive to the establishment of a voltage across the rectifier to automatically provide regenerative current dissipation in a braking circuit during a reduction in the speed at which the machine tool element is driven.

With the above and other objects in view as will hereinafter appear, the nature of the invention will be more clearly understood by reference to the following detailed description, the appended claims, the accompanying drawing.

IN THE DRAWING

There is shown a diagrammatic illustration of an electrical circuit including a compound wound DC generator, a DC motor in driving connection with a machine tool element and a rectifier-control relay combination and a dynamic braking circuit in parallel with the armature of the motor.

Referring to the drawing in detail, indicated generally at 10 is a compound wound DC generator. The generator 10 is schematically illustrated as including an armature 11 having commutator field windings 12 and 13 connected in series therewith. Shunt field windings 14 and 15 are shown connected in parallel with the armature 11 and the commutator windings 12 and 13. A series field winding 16 is provided in series with the parallel connection of the shunt field windings 14 and 15 and the armature 11. The generator 10 is driven by a suitably chosen motor 17, as by the mechanical connection of the motor 17 with the armature 11 as shown at 18.

The generator 10 serves as a DC power source applying a DC voltage at the output terminals 20, 21. A control rheostat 22 connected in series with the shunt field windings 14 and 15 provides control of the DC voltage applied at the terminals 20 and 21.

A pair of power supply lines L1 and L2, each including one of a pair of protective fuses 23 and 24 supply DC power to a DC motor, generally indicated by the numeral 25. The motor 25, as schematically illustrated in the drawing, includes an armature 26, having connected in series therewith a commutator field winding 27. A shunt field winding 28 is connected in parallel across the series connection of the armature 26 and the commutator field winding 27. Rotational output from the motor 25 is applied to a driven machine tool element, generally indicated by the numeral 30 as by the mechanical interconnection of the armature 26 with the machine tool element 30, as indicated at 31.

The shunt field winding 28 of the DC motor 25 is connected to the positive output terminal 21 of the generator 10 via the line L2. Similarly, the shunt field winding 28 is connected to the negative output terminal 20 of the generator 10 via the line L1 and a field control rheostat 32. The field control rheostat 32 provides motor speed control, allowing the increasing and decreasing of current in the shunt field winding.

Energization of the armature 26 and the commutator winding 27 of the motor 25 is provided by connection of the motor armature 26 with the negative output terminal 20 of the generator 10 via the supply line L1. A suitably chosen overload protective device, shown in the drawing, as an overload breaker, generally indicated by the numeral 33, is interposed between the armature 26 and the supply line L1 to protect the armature circuit of the motor 25. Similarly, a control contact H1 is provided in series with the armature 26 and is controlled and maintained closed by a control relay H during the energization of the relay H from the supply lines L1 and L2.

Deenergization of the control relay H occurs upon the opening of a relay contact 34 provided in series with the relay H between the lines L1 and L2. The relay contact 34 is controlled from a further control relay (not shown) for controlling the application of current to the armature circuit of the DC motor 25.

Energization of the motor armature 26 from the positive output terminal 21 of the generator 10 and the supply line L2 is provided through a rectifier 35 interposed between the line L2 and the commutator field winding 27 of the motor 25. The rectifier 35 allows current to be passed to the armature 26 from the generator 10 and is effective to block the passage of current in the reverse direction.

A dynamic braking resistor 36 is connectable in parallel across the motor armature 26 and the commutator winding 27. A further control relay HDB is connected in series with the relay H and the relay contact 34 between the supply lines L1 and L2. The relay HDB is normally energized to maintain open a normally closed relay contact HDB1 which is connected in series with the braking resistor 36.

A regenerative current relay 1CR is connected in parallel with the rectifier 35 and has a contact 1CR1 connected in parallel across the relay HDB. Establishment of a voltage across the rectifier 35, other than the normal minimal voltage established thereacross during the normal running of the motor 25, energizes the regenerative current relay 1CR, closing the contact 1CR1 to bypass and deenergize the relay HDB and close the relay contact HDB1. Thus, energization of the regenerative current relay 1CR effects a connection of the dynamic braking resistor 36 in parallel with the armature circuit of the motor 25.

In operation, during the normal running of the motor 25, the motor 25 is energized from the output terminals 20 and 21, current being applied to the armature circuit of the motor 25 via the rectifier 35. However, when the motor field control rheostat 32 is varied to reduce the rotational output of the motor 25, a regenerative current is produced in the armature circuit of the motor 25 by the tendency of the motor 25 to now act as a generator. The regenerative current is in a direction opposite to the current normally applied to the armature circuit of the motor 25 by the generator 10 and the rectifier 35 blocks the passage of the regenerative current, thereby preventing application of that current to the generator 10. Upon blockage of the regenerative current by the rectifier 35, a voltage is established across the rectifier 35, energizing the regenerative current relay 1CR to effect closing of the relay contact HDB1 by deenergization of the relay HDB as set forth hereinabove. The regenerative current is, then, directed through normally closed relay contact HDBL into the dynamic braking resistor 36, dissipating such current as it provides a braking action for the slowing of the motor 25. The rectifier 35, then, provides a control voltage, effecting the operation of the regenerative current relay 1CR, as well as preventing the application of regenerative current to the generator 10.

Upon a slowing of the motor 25 a predetermined amount, as established by the motor field control rheostat 32, the regenerative current from the armature circuit of the motor 25 diminishes, the voltage across the rectifier 35 similarly diminishes and the regenerative current relay 1CR is deenergized to effect energizing of relay HDB and opening of the relay contact HDB1. Thus, normal running of the motor 25 is automatically resumed by the application of current to the motor armature circuit through the rectifier 35 and terminals 20 and 21 of the generator 10.

Opening of the relay contact 34 to stop the motor 25 results in a deenergization of the control relay H, opening the circuit to the motor armature 26 as set forth hereinabove. Additionally, opening of the contact 34 deenergizes the relay HDB to effect closing of the relay contact HDB1 in the braking circuit and regenerative current dissipation is effected during the shutting down of the motor 25, as well as during the mere slowing of the motor.

The provisions shown and described above represent a preferred form of the invention, however, it will be readily apparent that variations may be made in such provisions without departure from the scope and spirit of the invention as defined by the appended claims.

I claim:

1. A motor speed control system including a DC motor, armature circuit means for connecting the armature of said motor across a DC source for supplying current to said armature, field circuit means for connecting a field winding of said motor across a DC source, means for controlling the speed of said motor, current blocking means in said armature circuit means for passing current to said armature and for blocking regenerative current in said armature circuit means upon a decrease in speed of said motor without disconnecting said DC source, braking circuit means for dissipating regenerative current and control means coupled to said current blocking means and responsive to the appearance of voltage across said current blocking means upon a decrease in speed of said motor for connecting said braking circuit means in current dissipating relation with the armature.

2. The motor speed control system according to claim 1 wherein said control means comprises means responsive to a reduction of voltage across said current blocking means for disconnecting said braking circuit means.

3. The motor speed control system according to claim 1 wherein said current blocking means comprises rectifier means in series with the armature of the motor for passing current through said armature circuit means to the armature and for preventing the passage of regenerative current from the armature through said armature circuit means, said control means comprising switching means responsive to the establishment of a voltage across said rectifier means for connecting said braking circuit means across the motor armature upon the production of a regenerative current from the armature and responsive to a reduction of the regenerative current from the armature for breaking the connection of said braking circuit means across the armature.

4. The motor speed control system of claim 3 wherein said switching means comprises a first relay connected in parallel with said rectifier means and in series with the motor armature, switch contact means connected in series with said braking circuit means and both said switch contact means and braking circuit means being connected in parallel with said armature and means responsive to actuation of said relay for opening and closing said switch contact means.

5. The motor speed control system of claim 4 further including a second relay and means for connecting said second relay to a DC source, said switch contact means comprising a relay contact of said second relay, normally maintained open by said second relay, said first relay having contact connected with said second relay for controlling the energization of said second relay to close said relay contact of said second relay upon the slowing of said motor to direct regenerative current through the relay contact of the second relay and said braking circuit means.

6. The motor speed control system according to claim 5 further comprising a third relay in series with said second relay, third relay contact controlled by said third relay and connected in series with said armature circuit means, and means controlling both said second and third relay for closing said relay contact of said second relay while opening said third relay contact to deenergize the armature of said motor.

7. The motor speed control system according to claim 1 further comprising motor disconnect means for stopping said motor, said motor disconnect means comprising means for disconnecting said armature circuit means and means for actuating said control means to connect said braking circuit means in current dissipating relation with the armature.

8. In a motor circuit including a DC motor having a motor armature, a shunt field winding for connection across the motor armature, means for controlling the current in the shunt field winding to control the speed of the motor and generator means for providing a motor-operating DC voltage; the combination comprising rectifier means connected in series with said motor armature and the output of said generator, a braking circuit connected across said motor armature for dissipating regenerative current generated in said motor armature upon a slowing of said motor by said means for controlling the current in said shunt field winding, relay means connected in parallel with said rectifier means and switching means in said braking circuit for opening and closing said braking circuit, said rectifier means blocking the passage of said regenerative current from said motor armature to said generator means and providing a relay operating voltage for actuating said relay means upon slowing of said motor, and means responsive to said relay means for actuating said switching means.

9. A motor circuit according to claim 8 wherein said means responsive to said relay comprises a further relay electrically connected to said generator means and normally energized by the DC voltage provided by said generator means, said switching means comprising contact of said further relay, normally maintained open by said further relay during the energization of said further relay, said relay means connected in parallel with said rectifier means including a relay contact connected across said further relay for shunting said further relay upon actuation of said relay means to deenergize said further relay and close said contact of said further relay upon the slowing of said DC motor.

10. A speed control system for controlling the speed of a machine tool element and comprising a DC motor including an armature and a field winding, a machine tool element mechanically connected to driven relation with said DC motor, means for electrically connecting said DC motor to a DC power source, a braking circuit selectively connectable in parallel with said armature for dissipating regenerative current from said armature upon a slowing of said DC motor, rectifier means connected to series with said armature for blocking the passage of regenerative current from said armature to said means for electrically connecting without disconnecting said DC power source and for establishing a voltage across said rectifier means upon a slowing of said DC motor, control means electrically connected across said rectifier means responsive to said voltage for automatically connecting and disconnecting said braking circuit in parallel with said armature.

11. The speed control system of claim 10 further comprising motor disconnect means in addition to said rectifier means and relay means for deenergizing said armature and for actuating said control means to automatically connect said braking circuit in parallel with said armature.

12. The speed control system of claim 10 wherein said control means comprises relay means connected in parallel across said rectifier means and actuable in response to said voltage across said rectifier means, switching means in said braking circuit, means for opening and closing said switching means in response to actuation of said relay means.

13. The speed control system of claim 12 wherein said means for opening and closing said switching means comprises a further relay responsive to energization thereof from said means for electrically connecting said DC motor to a DC power supply for maintaining said switching means in an open condition and a relay contact connected to said further relay and operable by said relay means connected in parallel with said rectifier means for controlling said further relay to control opening and closing of said switching means.

14. A speed control system for controlling the speed of a machine tool element, said system comprising a DC motor having an armature, a commutator field winding in series with said armature and a shunt field winding in parallel with said armature and said commutator field winding; a machine tool element mechanically connected in driven relation with said DC motor; a compound wound DC generator electrically connected to said shunt field winding and said armature and commutator winding and comprising an armature, a commutator field winding in series with said armature, a shunt field winding in parallel with said armature and commutator field winding, and a series field winding in series with the parallel armature and shunt field winding; means for varying the current in said shunt field winding of said DC motor for controlling the speed of said DC motor; a braking resistor selectively connectable across said armature of said DC motor; a rectifier in series with the armature of said DC motor for blocking the passage of regenerative current to said DC generator upon a slowing of said DC motor and for establishing a voltage across the rectifier upon the production of said regenerative current; a first relay connected in parallel with said rectifier for energization by said voltage; a second relay normally energized from said DC generator; first relay contact connected with said second relay for controlling said second relay and operated by said first relay; second relay contact connected with said braking resistor and operated by said second relay for connecting and disconnecting said braking resistor, whereby regenerative current resultant from a slowing of said DC motor effects closing of said second relay contact through said first and second relays to place said braking resistor in current dissipating parallel relation with said DC motor armature.

15. A motor speed control system comprising a DC motor including an armature and a field winding, means for connecting said motor to a DC power source, a braking circuit selectively connectable and parallel with said armature for dissipating regenerative current from said armature upon a slowing of said motor, control means responsive to the production of regenerating current upon a decrease in speed of said motor for connecting said braking circuit in parallel with said armature and for directing regenerative current through said braking circuit while preventing regenerative current flow to said DC power source without disconnecting said DC power source and disconnect means in addition to said control means to direct regenerative current into said braking circuit.

16. A motor circuit according to claim 1, including disconnect means in addition to said control means for stopping said motor and actuating said control means to direct regenerative current into said braking circuit.